UNITED STATES PATENT OFFICE.

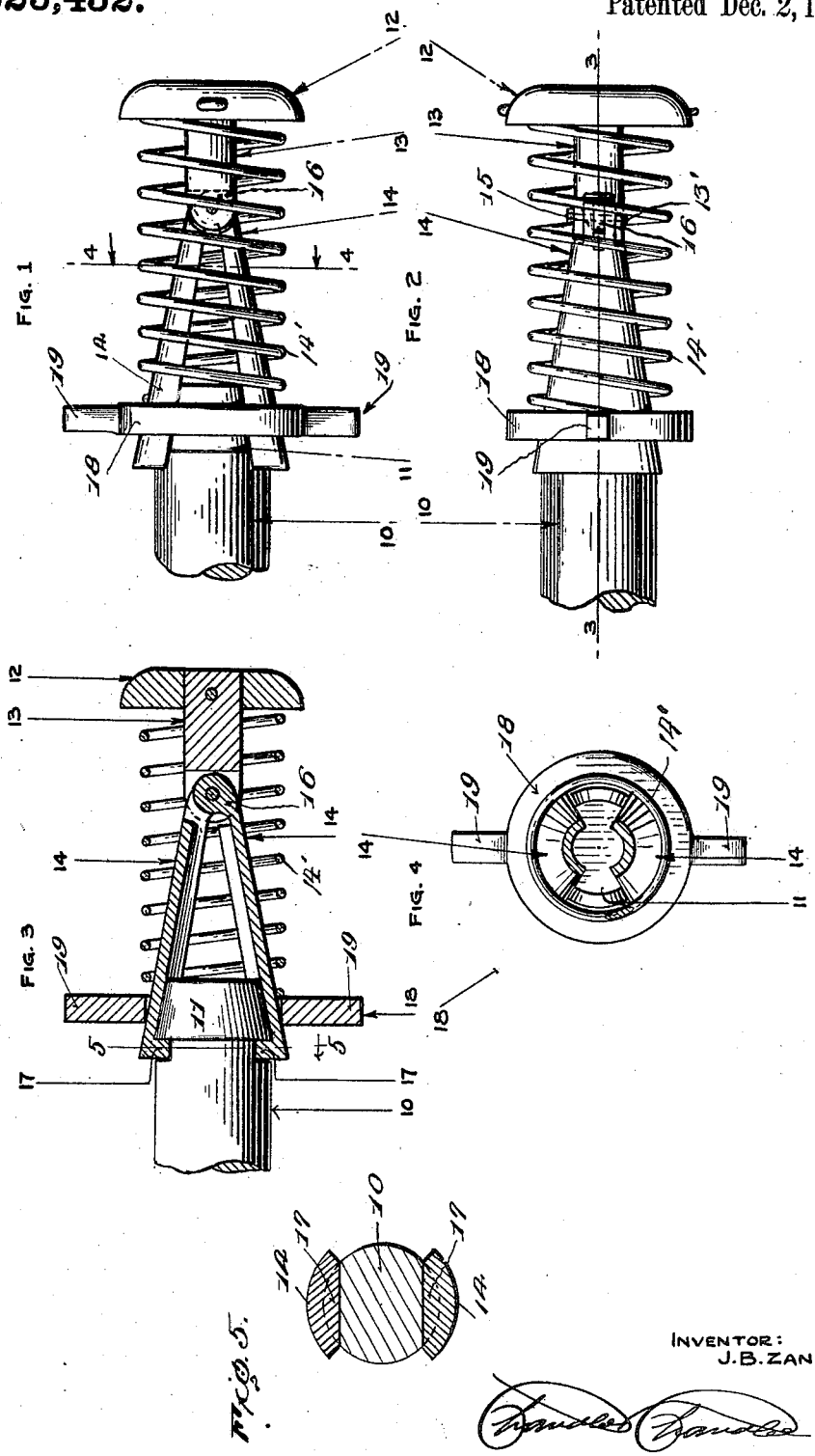

JOHN B. ZANDECKI, OF ONALASKA, WASHINGTON.

THREADLESS NUT.

1,323,432.   Specification of Letters Patent.   Patented Dec. 2, 1919.

Application filed January 24, 1919. Serial No. 272,865.

*To all whom it may concern:*

Be it known that I, JOHN B. ZANDECKI, a citizen of the United States, residing at Onalaska, in the county of Lewis, State of Washington, have invented certain new and useful Improvements in Threadless Nuts; and I do hereby declare the following to be a full, clear, and exact description of the invention, such as will enable others skilled in the art to which it appertains to make and use the same.

This invention relates to new and useful improvements in fastening devices and particularly to nuts.

One object of the present invention is to provide a novel and improved nut which is of such construction that the use of threads on the shaft, bolt, or the like, and the nut is obviated.

Another object is to provide a novel and improved device of this character which is capable of being easily and quickly applied or removed, and which will remain in applied position to hold the parts of the work together without danger of disengagement.

Other objects and advantages will be apparent from the following description when taken in connection with the accompanying drawing.

In the drawing:

Figure 1 is an elevation of the improved nut applied to the end of an axle or shaft.

Fig. 2 is an elevation view in a plane at right angles to that of Fig. 1.

Fig. 3 is a longitudinal sectional view taken on the line 3—3 of Fig. 2.

Fig. 4 is a transverse sectional view taken on the line 4—4 of Fig. 1.

Fig. 5 is a transverse sectional view taken on the line 5—5 of Fig. 3.

Referring particularly to the accompanying drawing, 10 represents the end portion of the axle of a vehicle having the opposite transverse grooves 11 on the sides of the axle inwardly of the end thereof.

The nut proper includes a head 12 having a central stem 13 which is bifurcated at its outer end. A pair of semi-tubular tapering members 14 are connected to said stem. One member 14 has its smaller end bifurcated as shown at 15 and is disposed between the legs of the bifurcation of the stem 13, while the smaller end of the other member 14, is formed with a central apertured lug 16 disposed between the bifurcations 15. A pivot pin 13' is disposed through the legs of the bifurcations of the stem, the first-mentioned member 14, and the lug 16 of the other member for holding the parts together and permitting free pivotal movement of the members 14. Extending transversely within the hollow portion of each of the members 14, at the outer end thereof, is a web 17. A ring 18 is engaged around the members 14 and is adapted to be moved longitudinally thereon to permit the said members to separate or to force them into closed gripping position. Extending radially from opposite sides of this ring 18 are the finger gripping pieces 19. Extending between the head 10 and the ring 18, and encircling the members 14 and the extension 13', is a coil spring 14', the normal tendency of which is to hold the ring in its outer limit of movement to cause the closing of the members 14.

It will be noted that the webs 17 engage with the flange 11 to hold the nut on the axle. When it is desired to remove the nut, the head is disposed in the palm of the hand and the members 19 grasped by the fingers of the same hand and pulled in the direction of the head. This will slide the ring 18 toward the pivotal ends of the arms or members 14, and permits said members to swing apart and out of engagement with the grooves of the axle, whereupon the nut may be easily and quickly removed. Thus the use of threads on the axle or in the nut is obviated.

What is claimed is:

A threadless nut including a head member formed with a central apertured and bifurcated extension, a pair of tapering and semi-tubular gripping members pivotally connected together at their smaller ends and pivotally connected to the bifurcated extension, a ring encircling the gripping members and slidable longitudinally thereon to open and close the said members, and a spring encircling the said members and engaging the head and ring, said ring being formed with radial finger-pieces.

In testimony whereof, I affix my signature in the presence of two witnesses.

JOHN B. ZANDECKI.

Witnesses:
L. M. BARTZ,
HELEN ORT.